(12) United States Patent
Tamai et al.

(10) Patent No.: US 6,428,363 B2
(45) Date of Patent: Aug. 6, 2002

(54) CONNECTING STRUCTURE FOR BATTERY TERMINALS

(75) Inventors: Yasuhiro Tamai; Takashi Gohara; Tetsuya Hasegawa, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/880,136

(22) Filed: Jun. 14, 2001

(30) Foreign Application Priority Data

Jun. 14, 2000 (JP) ........................................ 2000-178572

(51) Int. Cl.[7] .............................................. H01R 13/64
(52) U.S. Cl. ........................ 439/677; 439/756; 439/759; 439/726
(58) Field of Search ................................ 439/677, 726, 439/756, 759, 764, 725, 549, 557, 556, 553, 707

(56) References Cited

U.S. PATENT DOCUMENTS

| 4,030,796 | A | * | 6/1977 | Patzer | 339/61 |
| 4,372,636 | A | * | 2/1983 | Dufresne | 339/237 |
| 4,598,971 | A | * | 7/1986 | Goodman | 339/228 |
| 5,046,956 | A | * | 9/1991 | Takano | 439/78 |

FOREIGN PATENT DOCUMENTS

| DE | 197 19 919 A1 | 11/1998 | ............ H02H/3/18 |
| JP | 4-220947 | 8/1992 | ............ H01M/2/30 |

OTHER PUBLICATIONS

Patent abstracts of Japan 04–220947, Aug. 11, 1992.

English Language abstract DE19719919A1, Nov. 26, 1998.

* cited by examiner

Primary Examiner—P. Austin Bradley
Assistant Examiner—Alexander Gilman
(74) Attorney, Agent, or Firm—Sughrue Mion, PLLC

(57) ABSTRACT

Terminal covers (51, 52) have terminal accommodation spaces, each of which has an opening of a predetermined shape that permits only one of battery terminals (24, 25), which is of predetermined polarity, to be fitted thereto. Each of the battery terminals (24, 25) is formed in such a manner as to have a predetermined shape enabling the battery terminal to be fitted into the corresponding terminal accommodation space. The battery body (27) has cover fitting holes (54a, 54b (55a, 55b)), which permit only fitting projection pieces (51c, 51d (52c, 52d))of the terminal cover (51 (52)) accommodating and holding the battery terminal (24 (25)) to be fitted thereinto, in the vicinity of the battery electrode (29 (30)) so that only the battery terminal (24 (25)) is placed at a fastening/fixing position on the battery electrode (29(30)) Each of the fitting projection pieces (51c, 51d (52x, 52d) ) is formed in such a way as to have a predetermined shape that permits these pieces can be fitted into the corresponding cover fitting holes (54a, 54b (55a, 55b)).

6 Claims, 4 Drawing Sheets

CONNECTING STRUCTURE FOR BATTERY TERMINALS

BACKGROUND OF THE INVENTION

1. Technical Field of the Invention

The present invention generally relates to a connecting structure for battery terminals and, more particularly, to a connecting structure for surely connecting battery terminals to battery electrodes of corresponding polarity of a battery body mounted on a vehicle without miscontact of the battery terminals with the battery electrode.

2. Related Art

FIGS. 4 and 5 illustrate a related connecting structure for fastening and fixing battery terminals, provided at an end of an electric wire connected to various kinds of electrical equipment, to battery electrodes of a battery body, mounted on a vehicle, by screw members.

This connecting structure for a battery terminal is disclosed in JP-A-4-220947, and configured so that a positive battery electrode 3 and a negative battery electrode 4 of the vehicle-mounted battery body 1 are quadrangular-prism-like posts 3b and 4b respectively erected on base potions 3a and 4a on the top surface of the battery body 1.

Each of the posts 3b and 4b has a flat abutting surface 6 or 7 formed at the tip thereof. In each of abutting surface portions 6 and 7, a screw hole 8 or 9 for securing a battery terminal 11 or 12 (to be described later) by screws is formed. These screw holes 8 and 9 are provided so that the central axes thereof are eccentric from the central portions of the abutting surfaces in different directions in such a way as to make the position of the central axis of the positive electrode with respect to the center of the corresponding screw hole differ from that of the central axis of the negative electrode with respect to the center of the other screw hole.

Each of the battery terminals 11 and 12 includes: a flat plate portion 11a or 12a adapted to abut against a corresponding one of abutting surfaces 6 or 7 respectively formed at the tips of the posts 3b and 4b; an abutting wall portion 11b or 12b which is erected on an edge portion of a corresponding one of these flat plate portions 11a and 12a and abuts against an adjacent side surface of the corresponding post 3b or 4b; and a wire cramping portion 11c or 12c to which a corresponding electric wire 16 or 17 is press-attached.

Further, in each of the flat plate portions 11a and 12a, a screw insertion hole 14 or 15 is provided at an eccentric position corresponding to a corresponding one of the screw holes 8 and 9 respectively formed in the posts 3b and 4b to be connected thereto.

In the aforementioned connecting structure for the battery terminals, the flat plate portions 11a and 12a of the battery terminals 11 and 12 are set on the abutting surfaces 6 and 7 of the posts 3b and 4b so that the screw insertion holes 14 and 15 are aligned with the screw holes 8 and 9 of the posts 3b and 4b. Thus, each of the abutting wall portions 11b and 12b is caught on the corner portion of a corresponding one of the posts 3b and 4b. Consequently, the flat plate portions 11a and 12a serve as rotation inhibiting means.

Therefore, when fastened by bolts 19 screwed into the screw holes 8 and 9, the battery terminals 11 and 12 are restrained from rotating with respect to the posts 3b and 4b. This prevents a direction, in which the wire is drawn, from being changed.

Furthermore, as mentioned previously, the position, at which the screw hole 14 is formed, in the battery terminal 11 corresponding to one of the positive and negative battery electrodes is made to differ from the position, at which the screw hole 15 is formed, in the battery terminal 12 corresponding to the other battery electrode. This prevents each of the battery terminals from being misconnected to the battery electrode of the opposite polarity.

However, although the aforementioned related connecting structure for the battery terminals can prevent each of the battery terminals from being misconnected to the battery electrode of the different polarity, each of the battery electrodes 3 and 4 are exposed to the outside, so that the miscontact of each of the battery terminals 11 and 12 with the battery electrode of the opposite polarity may occur. Thus, there is a fear that electric backflow caused by the miscontact may break the equipment.

Especially, in recent years, there has been a tendency to enhance the efficiency of a vehicle power supply by increasing the voltage thereof. Thus, it is studied to replace 12-volt batteries and 24-volt batteries, which are currently in wide use, with 36-volt batteries. However, the implementation of a high-voltage battery increases the degree of seriousness of the problems of accidents due to the miscontact and sparks due to an arc.

Furthermore, recent increase in the power consumption of per vehicle results in increase in the number of batteries mounted on a vehicle. Thus, there is the need for contrivances to prevent occurrences of a misconnection and a miscontact of battery terminals with a plurality of batteries.

SUMMARY OF THE INVENTION

Accordingly, an object of the invention is to solve the problems, and to provide a connecting structure for reliably connecting each of battery terminals with a corresponding one of battery electrodes of a vehicle body without causing the miscontact of the battery terminals with the battery electrodes.

To achieve the foregoing object, according to the invention, there is provided a connecting structure for battery terminals, which is adapted to fasten and fix each of positive and negative battery terminals, which are respectively connected to end portions of wires, to one of battery electrodes, which is of corresponding polarity, of a battery body by screw members. This connecting structure comprises terminal covers, made of an insulating material, for accommodating and holding the battery terminals. Each of the terminal covers comprises a terminal accommodation space having an opening of a predetermined shape that permits only the battery terminal of corresponding polarity to be fitted thereinto. Each of the battery terminals is formed in such a way as to have a shape that permits fitting thereof into a corresponding one of the terminal accommodation spaces. The battery body comprises cover fitting holes of predetermined configurations, each of which permits only the fitting projection pieces of the terminal cover accommodating and holding the battery terminal of corresponding polarity, in the vicinity of each of the battery electrodes so that only the battery terminals are enabled to be placed at a fastening/fixing position on a corresponding one of the battery electrodes, which each of the fitting projection pieces is formed in such a manner as to have a shape enabled to be fitted into a corresponding one of the cover fitting holes.

With the aforementioned configuration, each of the positive and negative terminals respectively connected to the end portions of the wires is electrically connected to the corresponding battery electrode by being placed at a fastening/fixing position on the battery electrode of the corresponding polarity and fastened and fixed by a screw member thereto after the battery terminals are accommodated and held in the terminal covers for respectively accommodating and holding the battery terminals.

Even when the battery terminal is misfitted into the terminal accommodation space of the terminal cover that does not correspond to this battery terminal, this battery terminal cannot be fitted thereinto owing to the difference in the shape therebetween.

Further, even when the terminal cover having accommodated and held the battery terminal is misplaced at the fastening/fixing position on the battery electrode of the polarity that does not correspond to the terminal cover, the fitting projection piece of the terminal cover cannot be fitted to the cover fitting hole of the battery body owing to the difference in the configuration, such as the opening shape and the position, between the fitting projection piece and the fitting hole.

Thus, each of the battery terminals accommodated and held in the terminal accommodation spaces of the terminal covers cannot be placed at the fastening/fixing position on the battery electrode of the polarity that does not correspond thereto. Moreover, even the contact between the battery terminal, which is surrounded by the terminal cover, and the battery electrode of the polarity, which does not correspond to the battery terminal, cannot be achieved.

Therefore, the misconnection between the contact between the battery terminal and the battery electrode, which do not correspond to each other, is known without the contact and electrical conduction therebetween. Therefore, the misconnection therebetween can be reliably prevented.

Further, because the battery terminals are accommodated and held in the terminal accommodation spaces of the terminal covers, arc caused at a moment, at which the battery terminals are in contact with the battery electrodes occurs in the accommodation spaces. Thus, sparks due to the arc do not go out of the terminal covers.

Incidentally, preferably, the temporary latch means for temporarily latching each of the terminal covers at a fastening/fixing position on a corresponding one of the battery electrodes comprises the fitting projection pieces of the terminal covers and the cover fitting holes of the battery body.

Thus, when the terminal covers accommodating and holding the battery terminals are properly set on the battery electrodes, the temporary latch means provided between the fitting projection pieces of the terminal cover and the cover fitting holes of the battery body engage with one another, so that the apparatus is put into a state in which the battery terminals are temporarily fixed to the battery electrodes through the terminal electrodes.

Therefore, one hand of a worker can be prevented from being used for supporting the battery terminals during an operation. of fastening the battery terminals by the nuts. Consequently, the worker can easily perform the screwing operation by freely using both hands.

Furthermore, preferably, each of the battery electrodes comprises a pedestal portion formed in such a way to be projected from the battery body. Moreover, each of the pedestal portions has a predetermined outward form, which permits only the fitting concave portion of the terminal cover accommodating and holding the battery terminal of the corresponding polarity to be fitted thereonto.

Thus, even when each of the terminal covers respectively accommodating and holding the corresponding battery terminals is misplaced at the fastening/fixing positions on one of the battery electrodes, which is of the polarity that does not correspond thereto, the fitting concave portion of this terminal cover cannot be fitted thereonto because of the difference in shape between the corresponding battery electrode and the corresponding pedestal.

That is, in addition to the prevention of the misconnection according to the difference in the distance between the fitting projection pieces of the terminal cover and the cover fitting holes of the battery body, or in the width size of the pieces, the prevention of the misconnection according to the difference in the shape between the pedestal portions of the battery electrodes and the fitting concave portions of the terminal covers can be achieved.

Thus, even when a plurality of batteries are provided in the apparatus, for example, in the case of connecting a plurality of batteries, the misconnection between the battery terminals and the battery electrodes is prevented by suitably changing the shapes, sizes and combinations of such portions to thereby know an occurrence of the misconnection therebetween without the contact and electrical conduction between the battery terminals and the battery electrodes. Consequently, the, misconnection therebetween is reliably prevented.

DETAILED DESCRIPTION OF PREFERRED EMBODIMENT

Hereinafter, a connecting structure for battery terminals according to an embodiment of the invention is described in detail with reference to the accompanying drawings.

Figure 1:
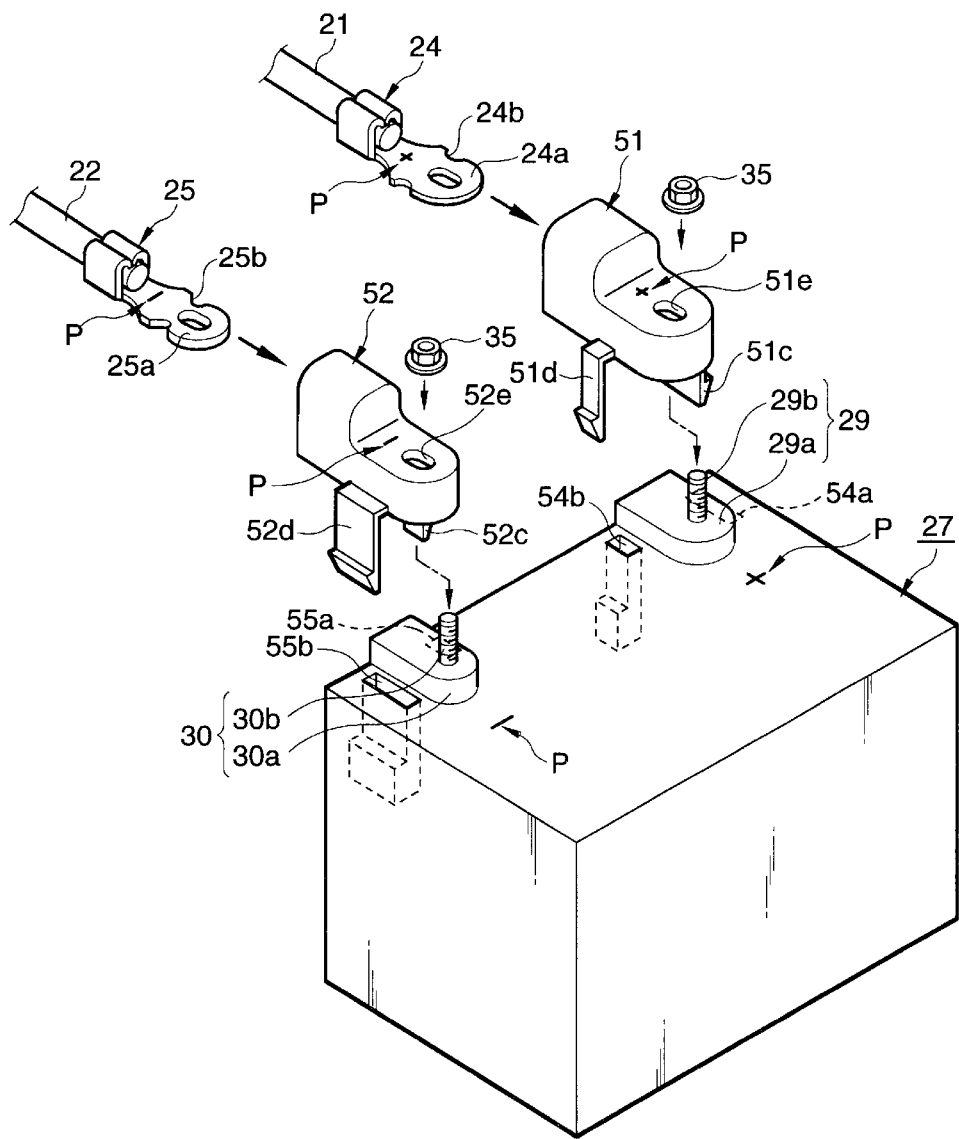
FIG. 1 is a perspective view illustrating the entire battery body having a connecting structure for a battery terminal according to a first embodiment of the invention.
Figure 2:
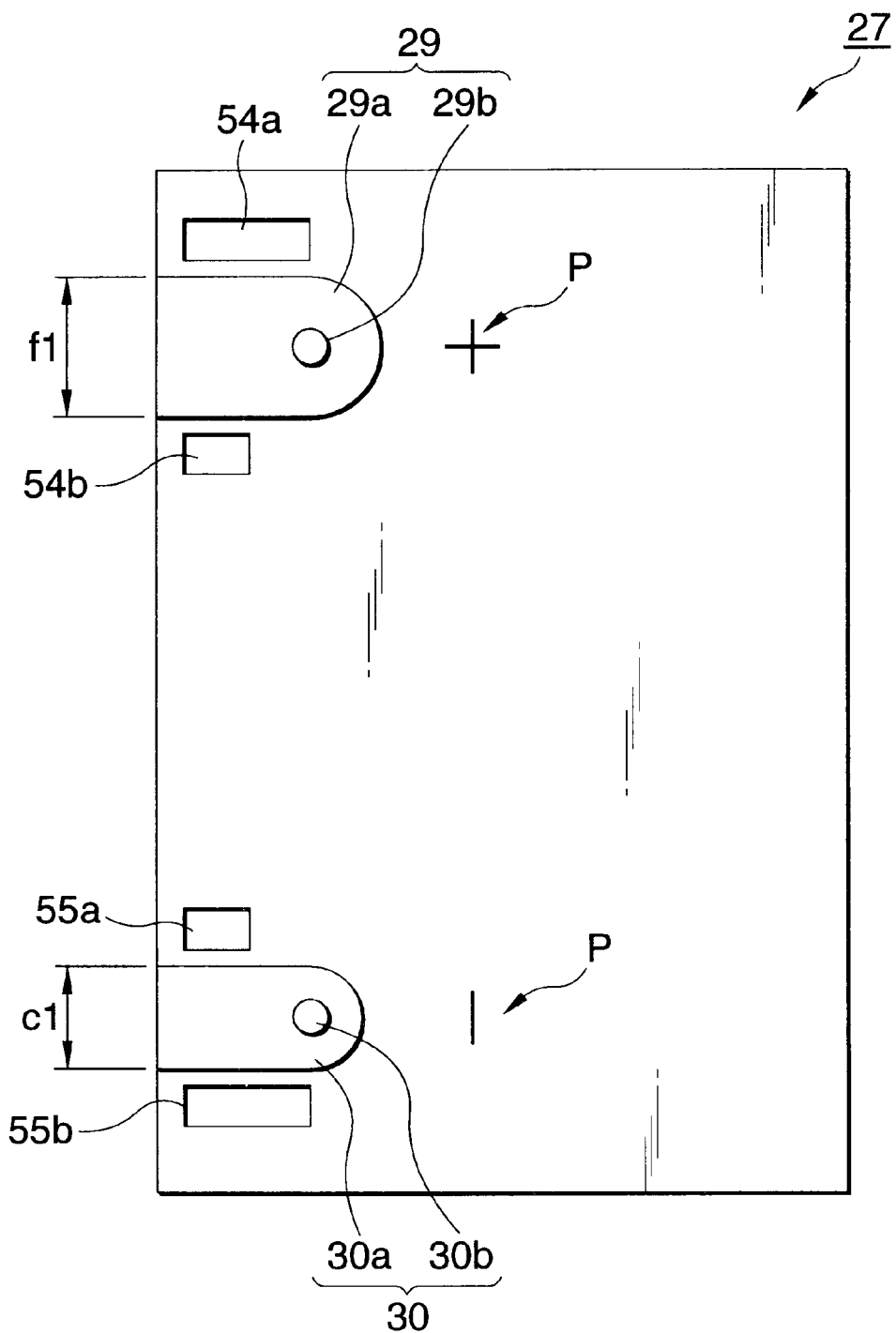
FIG. 2 is a plan view illustrating the battery body shown in FIG. 1.
Figure 3:
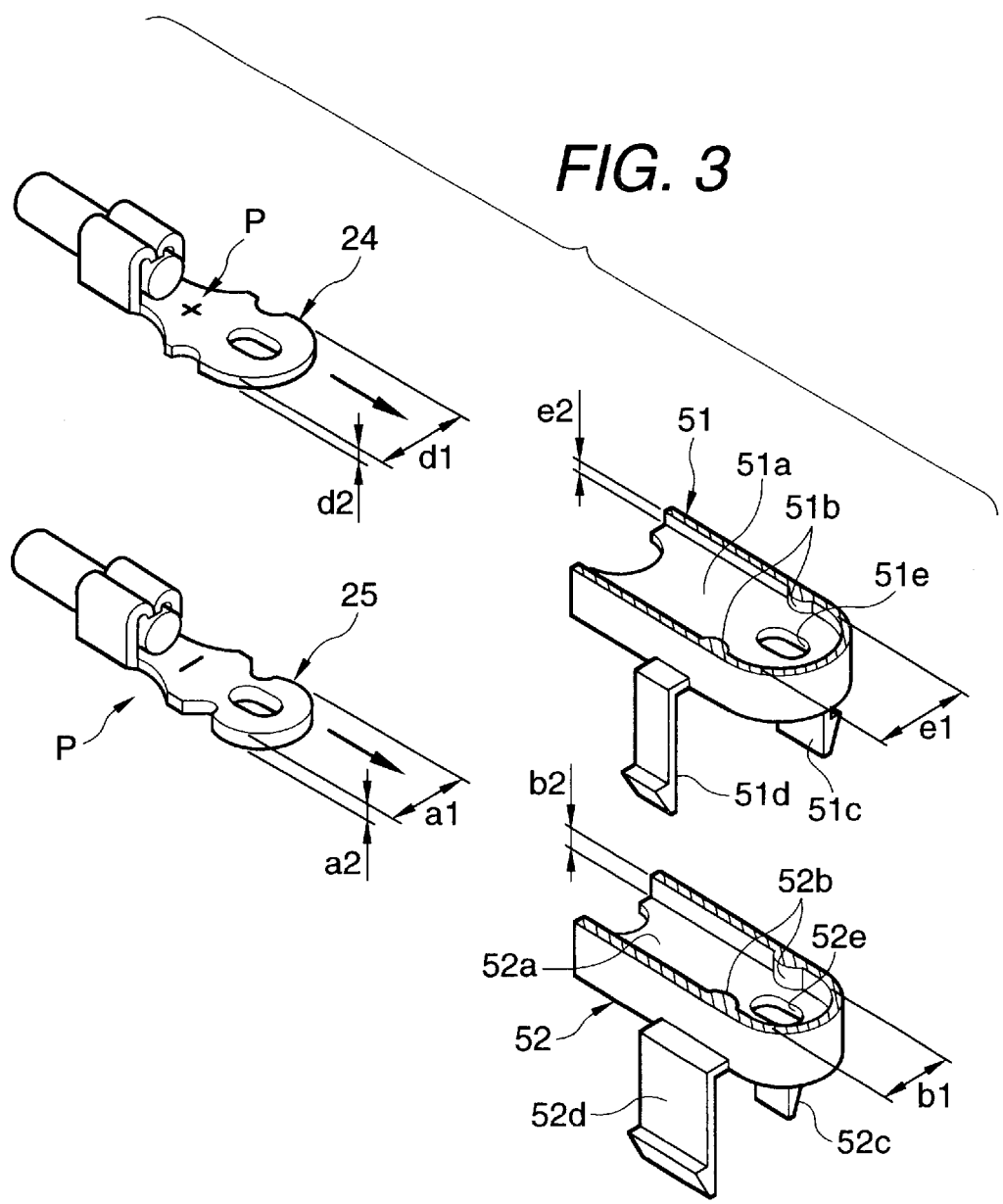
FIG. 3 is a partially broken perspective view of the internal structure of a primary part of the terminal cover shown in FIG. 1.
Figure 4:
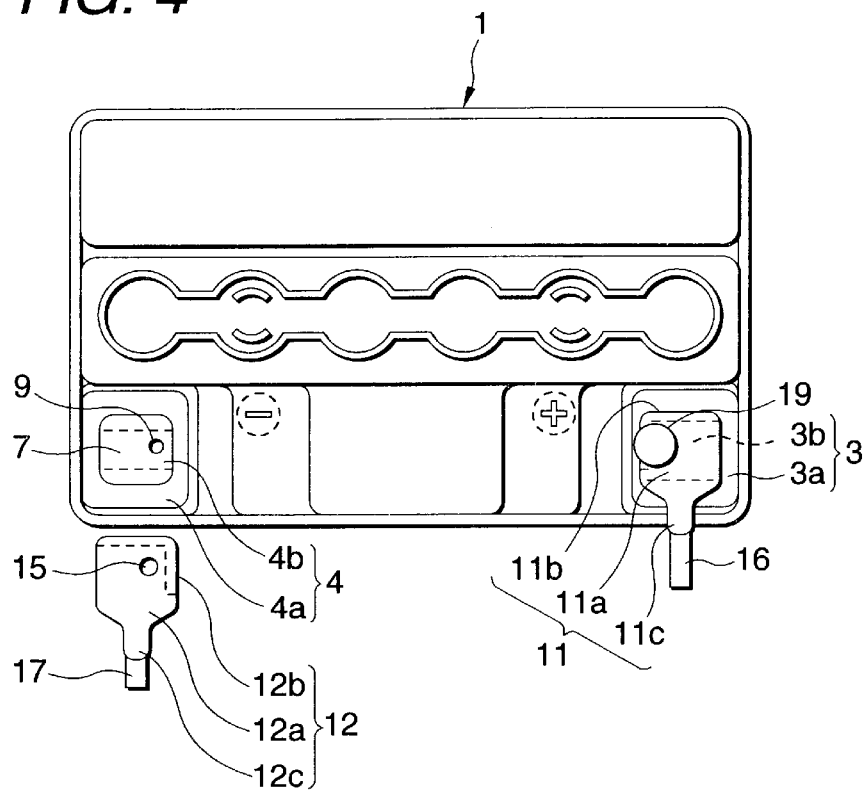
FIG. 4 is a plan view of a battery body having a related connecting structure for a battery terminal.
Figure 5:
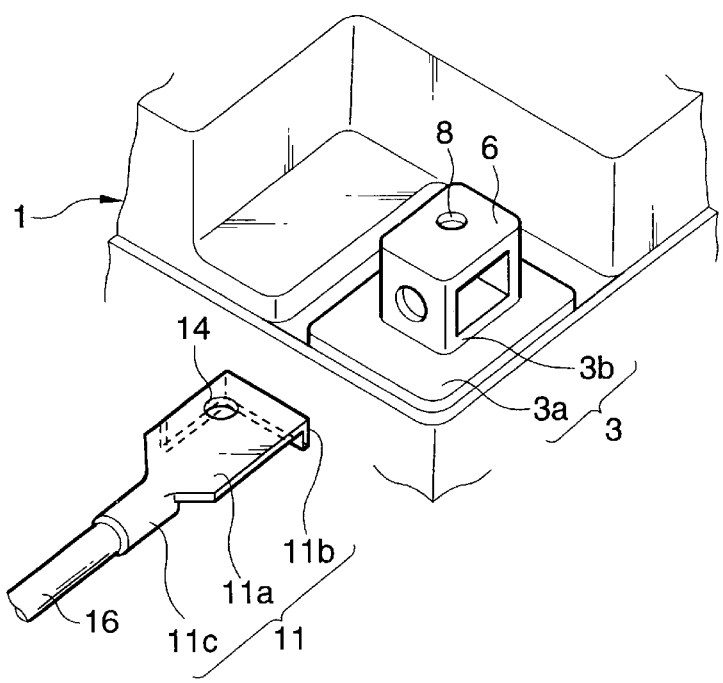
FIG. 5 is an enlarged perspective view illustrating the connecting structure for a battery terminal, which is shown in FIG. 4.

FIG. 1 is a perspective view illustrating the entire battery body having a connecting structure for a battery terminal according to a first embodiment of the invention. FIG. 2 is a plan view illustrating the battery body shown in FIG. 1. FIG. 3 is a partially broken perspective view of the internal structure of a primary part of the terminal cover shown in FIG. 1.

As shown in FIG. 1, the connecting structure for battery terminals is adapted to establish the electrical connection between battery terminals and battery electrodes by fastening and fixing each of the battery terminals 24, 25 to one of the battery electrodes 29, 30 by using a nut 35 serving as a screw member. The battery terminals 24, 25 respectively correspond to the positive polarity and the negative polarity and are connected to the end portions of the wires 21 and 22. Each of the battery electrodes 29, 30 is of corresponding polarity. The battery terminals 24 and 25 are accommodated and held in the terminal cover 51 for the positive electrode, and the terminal cover 52 for the negative electrode, respectively. The terminal covers 51 and 52 are made of an insulating material.

As illustrated in FIGS. 1 and 2, the positive battery electrode 29 and the negative battery electrode 30, and pairs of cover fitting holes 54a and 54b (55a, 55b) recessed in the vicinity of the battery electrodes 29, 30 are provided on the top surface of the battery body 27.

Each of the battery electrodes 29, 30 comprises a corresponding one of pedestal portions 29a, 30a, on the top surfaces of which the terminal covers 51, 52 accommodating the battery terminals 24, 25 are placed, and a corresponding one of male screw portions 29b, 30b that serve as electrode posts and that are provided on the pedestals 29a and 30a in such a manner as to extend in a direction perpendicular thereto.

Further, in this embodiment, each of the pedestal portions 29a, 30a of the battery electrodes 29, 30 has a predetermined form, which permits only fitting concave portions (not shown) formed in the bottom surface portions of the terminal covers 51 and 52 to be fitted there-onto.

That is, the pedestal portion 29a is adapted to have an outward form, whose width size f1 is wider than a width size c1 of the pedestal portion 30a. Each of the fitting concave portions respectively formed in the bottom surface portions of the terminal covers 51 and 52 has a concave shape, whose opening width corresponds to the width size c1 or f1 of a corresponding one of the pedestal portions 29a and 30a.

Further, a pair of cover fitting holes 54a and 54b (55a and 55b) are provided on opposite sides of and in the vicinity of each of the pedestal portions 29a and 30a. These cover fitting portions each have a predetermined configuration (in this embodiment, the predetermined difference in the opening shape and the predetermined interval at which the holes are formed), which enable only the fitting projection pieces 51c and 51d (52c and 52d) of the terminal cover 51 (52), which accommodates and holds the battery terminal 24 (25) of the corresponding polarity) to be fitted thereinto.

Further, in the case of this embodiment, polarity marks P each designating the polarity of each of the battery electrodes 29, 30 are provided on the top surface of the battery body 27. Moreover, the polarity marks P designating the polarity of the battery electrodes are provided thereon the battery terminals 24 and 25 and the terminal covers 51 and 52.

As illustrated in FIGS. 1 and 3, each of the terminal covers 51 and 52 has a flat terminal accommodation space 51a or 52a, a pair of fitting projection pieces 51c, 51c (52c, 52c) to be fitted to the cover fitting holes 54a and 54b (55a, 55b) of the battery body 27, and screw insertion holes 51e, 52e into which male screw portions 29b and 30b serving as the electrode posts of the battery electrodes 29 and 30, and accommodates and holds the battery terminals 24, 25 in such a way as to be able to be secured to the battery electrodes 29, 30 by screws.

Each of the terminal accommodation spaces 51a and 52a of the terminal covers 51 and 52, which respectively correspond to the positive electrode and the negative electrode, has a predetermined opening shape, which permits only the battery terminal 24 or 25 of the corresponding polarity to be fitted thereinto, and also has a cross section of a predetermined shape which allows only the corresponding battery terminal 24 or 25 to be fitted thereinto.

That is, the terminal accommodation space 51a has a nearly rectangular opening that has an opening width e1, which is wider than an opening width b1 of the terminal accommodation space 52a, and an opening height e2 that is lower than an opening height of the space 52a.

Further, the connecting flat plate portion 24a is shaped like a nearly rectangular cross section that has a plate width d1, which is wider than a plate width a1 of the connecting flat plate portion 25a of the battery terminal 25 corresponding to the negative electrode, and also has a plate thickness d2, which is thinner than a plate thickness a2 of the portion 25a. These battery terminals 24, 25 have relatively simple forms, which differ from each other only in the plate width and the plate thickness. Thus, these battery terminals can easily be formed bypress-molding. Consequently, the manufacturing cost thereof does not increase.

Furthermore, a pair of fitting projection pieces 51c, 51d (52c, 52d) to be fitted into the cover fitting holes 54a, 54b (55a, 55b) are locking pieces formed by causing an engaging projection to swell out of the tip end of an elastic piece extended from the side walls of the terminal cover 51 (52), and constitute temporary latch mechanism each adapted to engage with a latching stage portion to thereby temporarily latch the terminal covers 51 and 52 at the fastening/fixing positions on the battery electrodes 29, 30.

Furthermore, as illustrated in this figure, a pair of fitting projection pieces 51c and 51d disposed in such a manner as to face each other, and a pair of fitting projection pieces 52c and 52d disposed in such a way as to face each other are adapted in such a manner as to differ from each other in the distance between the fitting projection pieces of each of the pairs and in the width size of each of the opposed fitting projection pieces 51c, 51d (52c, 52d) of each of the pairs. This aims at increasing the number of combinations of configuration data, such as distances and width sizes, according to the difference in which an occurrence of the misconnection is prevented.

Further, locking convex portions 51b and 52b adapted to be engaged with the engaging concave portions 24b, 25b formed in the side edges of the connecting flat plate portions 24a, 25a of the battery terminals 24, 25 thereby to cause the battery terminals 24 and 25 to engage with and lock into the terminal covers 51 and 52 are formed on the inner walls of the terminal accommodation spaces 51a and 52a.

Thus, according to the connecting structure for the battery terminals of this embodiment, each of the battery terminals 24, 25, which respectively correspond to the positive electrode and the negative electrode and connected to the end portions of the wires 21 and 22, is accommodated and held in a corresponding one of the terminal covers 51, 52 for accommodating and holding the battery terminals, and then disposed at a fastening/fixing positions on the battery electrode of the corresponding polarity and fastened and fixed thereto by the nut 35, thereby to be electrically connected to the battery electrodes.

Even when, for example, the battery terminal 24 for the positive electrode is misfitted into the terminal accommodation space 52a of the terminal cover 52 corresponding to the polarity, which does not correspond to this battery terminal, (that is, to the negative electrode) at that time, this battery terminal 24 interferes with the opening edge of the terminal accommodation space 52a because the plate width d1 of the connecting flat plate portion 24a is wider than the opening width b1 of the terminal accommodation space 52a. Consequently, this battery terminal 24 cannot be fitted into this terminal accommodation space 52a.

Further, even when the battery terminal 25 for the negative electrode is misfitted into the terminal accommodation space 51a corresponding to the polarity, which does not correspond to this battery terminal 25 (that is, the positive electrode), this battery terminal 25 interferes with the opening edge of the terminal accommodation space 51a because the plate thickness ad2 of the connecting flat plate portion 25a is thicker than the opening height b1 of the terminal accommodation space 51a. Consequently, this battery terminal 25 cannot be fitted into this terminal accommodation space 32a.

Thus, the misinsertion, that is, misfitting of the battery terminal 24 (25) into the terminal cover 52 (51), which does not correspond to this battery terminal, does not occur.

Even when, for example, the terminal cover 51 accommodating and holding the battery terminal 24 for the positive electrode is misplaced at the fastening/fixing position on the battery electrode 30 of the polarity, which does not correspond to the terminal cover 51, (that is, the negative polarity), the distance between the fitting projection pieces 51c, 51d of the terminal cover 51 is wider than the distance between the cover fitting holes 55a, 55b, so that the fitting projection pieces 51c, 51d cannot be fitted into these cover fitting holes 55a, 55b.

Further, even when the terminal cover 52 accommodating and holding the battery terminal 24 for the negative electrode is misplaced at the fastening/fixing position on the battery electrode 29 of the polarity, which does not correspond to the battery terminal 25, (that is, the positive polarity), the distance between the fitting projection pieces 52c, 52d of the terminal cover 52 is narrower than the distance between the cover fitting holes 54a, 54b, so that the fitting projection pieces 52c, 52d cannot be fitted into these cover fitting holes 54a, 54b.

Thus, the battery terminal 24 (25) accommodated and held in the terminal accommodation space 51a (52a) of the terminal cover 51 (52) cannot be disposed at the fastening/fixing position on the battery electrode 30 (29) of the polarity, which does not correspond to the battery terminal 24 (25). Consequently, even the contact of the battery terminal 24 (25) surrounded by the terminal cover 51 (52) with the battery electrode 30 (29) of the polarity, which does not correspond to the battery terminal 24 (25), cannot be achieved.

Thus, the misconnection between the contact between the battery terminal 24 (25) and the battery electrode 30 (29), which do not correspond to each other, is known without the contact and electrical conduction therebetween. Therefore, the misconnection therebetween can be reliably prevented.

Consequently, according to the connecting structure for battery terminals of this embodiment, there is no fear that electric backflow caused by the miscontact may break the equipment.

Further, because the battery terminals 24, 25 are accommodated and held in the terminal accommodation spaces 51a, 52a of the terminal covers 51, 52, arc caused at a moment, at which the battery terminals 24, 25 are in contact with the battery electrodes 29, 30, occurs in the accommodation spaces 51a, 52a. Thus, sparks due to the arc do not go out of the terminal covers 51, 52.

Therefore, according to the connecting structure for battery terminals of this embodiment, sparks generated owing to the arc at the time of connecting the battery terminal to the battery electrode can be reliably prevented from falling down the hands of the worker. Consequently, the reliability and safety of the structure can be enhanced.

Furthermore, in the case of the terminal covers 51, 52 of this embodiment, the fitting projection piece 51c, 51d (52c, 52d) and the cover fitting holes 54a, 54b (55a, 55b) constitute temporary latch mechanism for temporarily latching the terminal covers 51, 52 at the fastening/fixing positions on the battery electrodes 29, 30.

Thus, when the terminal covers 51, 52 accommodating and holding the battery terminals 24, 25 are properly set on the battery electrodes 29, 30, the temporary latch mechanism provided between the fitting projection pieces 51c, 51d (52c, 52d) of the terminal cover 51 (52) and the cover fitting holes 54a, 54b (55a, 55b) of the battery body 27 engage with one another, so that the apparatus is put into a state in which the battery terminals 24, 25 are temporarily fixed to the battery electrodes 29, 30 through the terminal electrodes 29, 30.

Therefore, one hand of a worker can be prevented from being used for supporting the battery terminals 24, 25 during an operation of fastening the battery terminals by the nuts 35. Consequently, the worker can easily perform the screwing operation by freely using both hands. Moreover, the number of working hours can be reduced.

Further, the pedestal portions 29a, 30a are configured in such a way as to have an outward form, which permits only the fitting concave portions formed in the bottom surface portion of the terminal covers 51, 52, each of which accommodates and holds the battery terminal 24 or 25 of the corresponding polarity, to be fitted thereonto. Thus, even when each of the terminal covers 51, 52 respectively accommodating and holding the corresponding battery terminals 24, 25 is misplaced at the fastening/fixing positions on one of the battery electrodes 30, 29, which is of the polarity that does not correspond thereto, the fitting concave portion of this terminal cover 51 or 52 cannot be fitted thereonto because of the difference in shape between the corresponding battery electrode 30 or 29 and the corresponding pedestal 29a or 30a.

That is, in addition to the prevention of the misconnection according to the difference in the distance between the fitting projection pieces 51c, 51d (52c, 52d) of the terminal cover 51, 52 and the cover fitting holes 54a, 54b (55a, 55b) of the battery body 27, or in the width size of the pieces, the prevention of the misconnection according to the difference in the shape between the pedestal portions 29a, 30a of the battery electrodes 29, 30 and the fitting concave portions of the terminal covers 51, 52 can be achieved.

Thus, even when a plurality of batteries are provided in the apparatus, for example, in the case of connecting a plurality of batteries, the misconnection between the battery terminals and the battery electrodes is prevented by suitably changing the shapes, sizes and combinations of such portions to thereby know an occurrence of the misconnection therebetween without the contact and electrical conduction between the battery terminals and the battery electrodes. Consequently, the misconnection therebetween is reliably prevented.

Furthermore, the angle, which the top surface of each of the pedestal portions 29a, 30a forms with the top surface of the battery body 27, and the shape thereof, and the positions of the projection pieces are modified in various manners. Moreover, the concave shapes of the fitting concave portions of the terminal covers 51, 52 are changed in such a manner as to be adjusted to such modifications. This enables the determination of the directions, in which the wires 21, 22 are provided and drawn, according to the conditions for mounting the apparatus on a vehicle (for example, whether a plurality of batteries are mounted thereon, or whether a high-voltage battery (for instance, a 36-volt battery) is mounted thereon).

Furthermore, the fitting concave portions formed in the bottom surface portions of the terminal covers 51, 52 are fitted onto the pedestal portions 29a, 30a. Thus, when a worker performs an operation of fastening and fixing the battery terminals 24, 25 to the battery electrodes 29, 30, the battery terminals 24 and 25 are restrained from rotating with respect to the pedestal portions 29a, 30a through the terminal covers 51, 52. This prevents a direction, in which each of the wires 21, 22 is drawn, from being changed.

Incidentally, the configurations of the battery terminals, the battery covers, the battery electrodes, the screw members, the terminal accommodation spaces, and the temporary latch mechanism in the connecting structure for battery terminals of the invention are not limited to those of the aforementioned embodiment. Needless to say, various modifications maybe made according to the gist of the invention.

For example, although the battery terminals 24, 25 are fastened and fixed to the battery electrodes 29, 30 by the nuts 35 in this embodiment, the electrodes may be configured so that female screws are tapped into the pedestal portions 29a, 30a, and that the battery terminals 24, 25 are fastened and fixed thereto by bolts serving as the screw members.

What is claimed is:

1. A connecting structure for a battery terminal comprising:
    a battery body including a first and second electrode;
    a first battery terminal for electrical connection to the first electrode connected to a wire;
    a second battery terminal for electrical connection to the second electrode connected to a wire;
    a first insulative terminal cover having a first fitting projection piece and a first terminal accommodation space for accommodating and holding the first battery terminal therein, the first battery terminal having a shape which permits the first battery terminal to be insertable into the first terminal accommodating space;
    a second insulative terminal cover having a second fitting projection piece and a second terminal accommodation space for accommodating and holding the second battery terminal therein, the second battery terminal having a shape which permits the second battery terminal to be insertable into the second terminal accommodation space, wherein the first battery terminal is not insertable to the second accommodation space, and the second battery terminal is not insertable to the first accommodation space;
    a first cover fitting hole for fitting the first fitting projection piece therein provided at a portion of the battery body adjacent to the first electrode; and
    a second cover fitting hole for fitting the second projection piece therein provided at a portion of the battery body adjacent to the second electrode,
    wherein the first and second fitting projection pieces are formed in different shapes so that the first fitting projection piece can not be fitted to the second cover fitting hole and the second projection piece cannot be fitted to the first fitting hole.

2. The connecting structure for battery terminals according to claim 1, wherein each of the first fitting projection piece and the first cover fitting hole, and the second fitting projection piece and the second cover fitting hole are constructed so as to temporary latching each of first and second terminal covers at a fixing position on each first and second electrodes.

3. The connecting structure for battery terminals according to claim 1, wherein the battery body includes a first projected pedestal on which the first electrode is provided and a second projected pedestal on which the second electrode is provided, the first and second projected pedestals have different shapes so that the first battery cover can not be fitted to the second projected pedestal and the second battery cover can not be fitted to the first projected pedestal.

4. The connecting structure for battery terminals according to claim 1, wherein one of the first and second electrodes is positive electrode and the other of the first and second electrodes is negative electrode.

5. The connecting structure for battery terminals according to claim 1, wherein the first fitting projection piece is formed a pair of first projections and the second fitting projection piece is formed of a pair of second projections, a distance between the first projections is narrower than a distance between the second projections.

6. The connecting structure for battery terminals according to claim 1, wherein a width of the first fitting projection piece is smaller than a width of the second fitting projection piece.

* * * * *